Patented Aug. 15, 1950

2,518,462

UNITED STATES PATENT OFFICE 2,518,462

ABRASION RESISTANT FINISHES CONTAINING POLYETHYLENE

Daniel M. Gowing, Swarthmore, Dorothy R. Langdon, Philadelphia, and Royce L. Selby, Lansdowne, Pa., assignors to E. I. du Pont de Nemours & Company, Wilmington, Del., a corporation of Delaware No Drawing. Application September 10, 1946, Serial No. 696,040

7 Claims. (Cl. 260—17.4)

This invention relates to protective coatings, and particularly to coating compositions which possess a high degree of abrasion resistance.

With the development of new and improved synthetic resin materials, their use in coating compositions has been greatly extended. Marked progress has been made in the development of both air dry and baking synthetic resins, enamels and clears. Although such protective coatings have yielded, in general, satisfactory service, there are certain properties in which improvement is desirable. Extensive commercial use has been made of white synthetic resin enamels for finishing such articles as refrigerators, kitchen cabinets and other kitchen furniture, hospital equipment, dental furniture, and similar finishes are currently being used on automobiles, on furniture, both for household and office use, and on a large variety of industrial equipment. Compositions containing synthetic resins are likewise used on wood and composition floors and as a topcoating for linoleum and like floor coverings.

These finishes yield long and satisfactory service, but for some uses they have been found deficient in resistance to abrasion. As examples of finished articles which are subject to large amounts of abrasion may be mentioned the shelves of refrigerators where heavy dishes and milk bottles are caused to slide back and forth many times daily; floors in homes, on steps and in public places; linoleum and other floor coverings, in kitchens, bathrooms, etc., and automobiles, especially in regions where dust storms are prevalent, or whose owners frequently polish them with abrasive materials.

Many attempts for improving the mar-resistance of synthetic enamels have been made. One of these contemplates the addition of a small amount of a wax such as candelilla, carnauba, beeswax or similar high melting wax. While the prior art attempts have met with some success, most of them offer difficulties in incorporating the modifying agent into the vehicle and nearly every such attempt decreases the overall efficiency of the unmodified coating composition.

It is therefore apparent that the development of any successful means which increases the resistance to abrasion of protective coatings for the uses mentioned above, would be highly desirable and of considerable commercial importance.

This invention has as its principal object the provision of protective coatings, the dry films of which will have a high degree of resistance to abrasion.

A further object is the provision of such protective coatings, having a high degree of resistance to abrasion interfering as little as possible with any of the other desirable properties of such coatings; as, for example, gloss, color, hardness, flexibility, general durability and satisfactory inter-coat adhesion.

Another object is to provide protective coatings by methods which are simple and economical.

A still further object is the provision of means for incorporating an ethylene polymer in a protective coating in such a manner that the abrasion resistance of the coating is enhanced.

Still another object is the provision of articles bearing a finished coating with improved resistance to abrasion.

Other objects will become apparent as the description of the invention proceeds.

These objects are accomplished in the present invention by incorporation into the protective coating, of a minor proportion of a polymer of ethylene, such as the polymer which is a solid at normal temperature, and corresponds in composition to $(CH_2)_x$, and which by X-ray diffraction analysis shows a crystalline structure. The preparation of these polymers, in general, is described in Fawcett et al. U. S. Patent 2,153,553, and is separated into polymers of various molecular weights by the process described in Krase U. S. Patent 2,388,160.

Similarly, modified polymers of ethylene are advantageous according to this invention, and particularly effective and valuable products for the purposes outlined have been obtained when the polymerization of ethylene is carried out in the presence of chain terminating agents, such as dioxolane, cyclohexane, methyl propionate, propionic acid anhydride, diethyl ether, methanol and hydrogen. The production of such modified ethylene polymers is described in Peterson, et al., U. S. 2,395,292, and in S. N. 438,466 (Hanford, et al.) filed April 10, 1942, S. N. 445,012 (Loder, et al.) filed May 29, 1942, 532,219 (Roland, et al.) filed April 21, 1944, 557,723 (Cooper) filed October 7, 1944, and 583,394 (Roland et al.) filed March 17, 1945, assigned to the assignee of the present invention.

In the claims and specification the term "solid polymer of ethylene" is intended to cover such polymers.

The invention will be more fully understood from the following examples, which are given by way of illustration and not of limitation, and in which the parts are by weight:

EXAMPLE I

*White baking refrigerator enamels*

|  | A | B | C | D |
|---|---|---|---|---|
| Titanium Dioxide | 24.34 | 24.34 | 24.34 | 24.34 |
| Alkyd Resin [1] | 19.34 | 19.34 | 19.34 | 19.34 |
| Urea-formaldehyde Resin [2] | 19.34 | 19.34 | 19.34 | 19.34 |
| N. Butanol | 15.67 | 15.67 | 15.67 | 15.67 |
| Hi Flash Naphtha | 21.31 | 21.24 | 20.97 | 19.89 |
| Candelilla Wax |  | .07 | .07 | .07 |
| Polymer of Ethylene |  |  | [3].27 | [4]1.35 |
|  | 100.00 | 100.00 | 100.00 | 100.00 |
| Abrasion Resistance: Strokes to Failure | 100 | 100 | 2,200 | 30,000–50,000 |

[1] The alkyd resin was a 43% dehydrated castor oil modified glyceryl phthalate having an acid number of approximately 12.
[2] This resin is a butanol modified urea-formaldehyde resin.
[3] This is a ratio of about .7 of ethylene polymer to 100 of binder.
[4] This is a ratio of about 3.5 of ethylene polymer to 100 of binder.

EXAMPLE II

*Air dry automobile enamel*

|  | A | B |
|---|---|---|
| Ferrite Yellow | 11.52 | 11.52 |
| Alkyd Resin A | 4.63 | 4.63 |
| Alkyd Resin B | 26.92 | 26.92 |
| Lead Drier Solution | 1.86 | 1.86 |
| Manganese Solution | .49 | .49 |
| Cobalt Drier Solution | .75 | .75 |
| Petroleum Naphtha | 53.83 | 52.60 |
| Polymer of Ethylene |  | 1.23 |
|  | 100.00 | 100.00 |
| Strokes to failure | 360 | 35,000 |

Alkyd resin A was a 52% linseed oil modified glyceryl phthalate having an acid number of approximately 6.5.

Alkyd resin B was a 48% treated linseed oil modified glyceryl phthalate with an acid number of 12.

The ratio of ethylene polymer to binder is about 2.7 to 100 in this example.

EXAMPLE III

*Orthodox floor varnish*

|  | A | B |
|---|---|---|
| Varnish [1] | 40.00 | 40.00 |
| Mineral Spirits | 60.00 | 55.24 |
| Polymer of Ethylene |  | [2]4.76 |
|  | 100.00 | 100.00 |
| Strokes to failure | 150 | 32,000 |

[1] 45 gal. rosin ester varnish having a ratio of oiticica/linseed = .4/1
[2] This is a ratio of about 12 parts of ethylene polymer to 100 of binder.

EXAMPLE IV

*Lacquer*

|  | A | B |
|---|---|---|
| Nitrocellulose (26 sec.) | 11.23 | 11.23 |
| Dibutyl Phthalate | 2.98 | 2.98 |
| Amyl Alcohol | 6.74 | 6.74 |
| Denatured Alcohol | 7.26 | 7.26 |
| Isopropyl Alcohol | 4.00 | 4.00 |
| Butyl Acetate | 16.01 | 16.01 |
| Methyl Ethyl Ketone | 12.33 | 12.33 |
| Petroleum Naphtha | 39.45 | 38.89 |
| Polymer of Ethylene |  | .56 |
|  | 100.00 | 100.00 |
| Strokes to failure | 310 | 48,000 |

The machine for testing the abrasion resistance was essentially a motor driven rubbing tool with an automatic counter. The rubbing tool was a one inch cylinder of glass with edges about 2 millimeters thick. The rubbing surface was of the "ground glass" type and was so rounded that only about one square millimeter of actual rubbing surface was in contact with the surface to be abraded. There was a weight of 1 kilogram superimposed on the rubbing tool. The coatings tested were approximately 1/1000 of an inch thick on metal. Failure was recorded when that thickness of coating was abraded through. The term "abrasion resistance" is used in the claims to denote resistance of the film to relatively mild abrasion throughout the entire thickness of the film, as distinguished from "mar resistance" which indicates the resistance of the film surface only to similar abrasion.

The four examples show ratios of ethylene polymer to binder ranging from 0.7 of polymer to 100 of binder to 12 of polymer to 100 of binder. We have found that less than the 0.7 part has but little effect on the resistance to abrasion, and that when more than 15 parts are incorporated, the integrity of the film suffers. It becomes soft and cheesy and otherwise undesirable.

For most uses, we have found that ratios of about 4 of polymer to 100 of binder are to be preferred.

In order to obtain the full benefits from polyethylene polymers with respect to abrasion resistance, it is desirable to have the polyethylene uniformly dispersed throughout the film. Any method which accomplishes this, such as dissolving it in the liquid vehicle, melting and mixing into the liquid vehicle, etc., will give abrasion resistant properties.

Our preferred method for adding polyethylene polymer entails finely dispersing it in an excess of a non-solvent such as butyl alcohol by ball milling or other suitable means. This yields a smooth milky polyethylene dispersion which is then added directly to the coating composition by agitation. This method is preferred because it gives properties desirable in coating compositions other than abrasion resistance such as freedom from seed formation, maximum gloss, etc.

The preferred method of manufacture may be divided into two procedures depending upon the physical state of the ethylene polymer being used.

(1) If a coarse grade of ethylene polymer (e. g., sheet, granules, rollstock, flake, etc.) is used it is heated with agitation with an equal weight of aromatic hydrocarbon such as toluene, xylene, etc., until solution is complete. The solution may then be chilled quickly by means of a "drum flaker" to yield flakes of ethylene polymer/hydrocarbon gel or it may be allowed to cool slowly with or without agitation to form a solid mass which is readily crushable. This ethylene polymer/hydrocarbon gel-like mass is broken up into small pieces and charged directly into a ball mill or other suitable grinding equipment with 1–2 times its own weight of normal butanol and ground for 10 to 15 hours. The resulting dispersion of polymer is then added directly to the coating composition in sufficient quantities to give the range of .7 to 15 parts of polymer for 100 parts of binder as shown in the foregoing.

(2) If the ethylene polymer is in a finely divided state known as "fluff" it may be charged directly into a ball mill or other suitable grinding equipment with 1–2 times its own weight of normal butanol and ground for 10–15 hours. The resulting dispersion is then handled as described in the above method.

The ethylene polymers which we have found useful in promoting the abrasion resistance of protective coatings are all of those described in U. S. Patent 2,153,553, Fawcett et al.; 2,388,160 Krase; 2,395,292 Peterson et al., and those described in S. N. 438,466 Hanford et al. filed April 10, 1942, now U. S. Patent No. 2,440,800; S. N. 445,012 (Loder et al.) filed May 29, 1942, now U. S. Patent No. 2,394,862; S. N. 532,219 Roland et al. filed April 21, 1944, now U. S. Patent No. 2,479,- 082; S. N. 557,723, Cooper filed October 7, 1944 now U. S. Patent No. 2,456,387; and S. N. 583,394 Roland et al. filed March 17, 1945, now U. S. Patent No. 2,433,015; all assigned to the assignee of the present invention.

The chief advantage of this invention is that it provides a means for increasing the resistance to abrasion of a protective coating by very large amounts, the increase being in some cases as much as five hundred fold. Another advantage is that protective coatings which contain the ethylene polymers are much more resistant to becoming soiled or dirty than are those without this addition.

It is apparent that many widely different embodiments of this invention may be made without departing from the spirit and scope thereof, and therefore, it is not intended to be limited except as indicated in the appended claims.

We claim:
1. A non-aqueous coating composition which yields a tough, durable film on drying which comprises organic film-forming material selected from the group consisting of vegetable drying oil modified alkyd resins, monohydric alcohol modified urea-formaldehyde resins, and nitrocellulose; and from 0.7 to 15% by weight thereof of a polymer of ethylene which is solid at room temperature and has a composition corresponding to $(CH_2)_x$ and shows a crystalline structure by X-ray diffraction.

2. A rigid article having an adherent coating of the composition of claim 1 on its surface.

3. The composition of claim 1 in which the film-forming material is a vegetable drying oil modified alkyd resin.

4. The composition of claim 1 in which the film-forming material is butyl alcohol modified urea-formaldehyde resin.

5. The composition of claim 1 in which the film-forming material is nitrocellulose.

6. In the process of increasing the abrasion resistance of coating compositions which dry to a hard durable finish, the improvement which comprises preparing a smooth dispersion in an organic liquid of a polymer of ethylene which is solid at room temperature and has a composition corresponding to $(CH_2)_x$ and shows a crystalline structure by X-ray diffraction; mixing with the said dispersion an organic film-forming agent, the said dispersion being present in an amount to yield a finished composition containing from 0.7 to 15 parts of the polymer of ethylene for each 100 parts of film-forming agent in the composition, the said film-forming agent being selected from the group consisting of vegetable drying oil modified alkyd resins, monohydric alcohol modified urea-formaldehyde resins, and nitrocellulose.

7. The process of preparing abrasion-resistant finishes which comprises grinding a polymer of ethylene which is solid at room temperature and has a composition corresponding to $(CH_2)_x$, and shows a crystalline structure by X-ray diffraction, with from 1 to 2 times its weight of butanol for 10 to 15 hours and thereafter mixing therewith an organic film-forming agent and pigment, the said polymer of ethylene being present in the finish in the amount of from 0.7 to 15% by weight of the said film-forming agent, the said film-forming agent being selected from the group consisting of vegetable drying oil modified alkyd resins, monohydric alcohol modified urea-formaldehyde resins, and nitrocellulose.

DANIEL M. GOWING.
DOROTHY R. LANGDON.
ROYCE L. SELBY.

REFERENCES CITED

The following references are of record in the file of this patent:

UNITED STATES PATENTS

| Number | Name | Date |
|---|---|---|
| 2,299,807 | Dunbar | Oct. 27, 1942 |
| 2,369,471 | Latham | Feb. 13, 1945 |
| 2,395,292 | Peterson et al. | Feb. 19, 1946 |
| 2,448,666 | Fletcher et al. | Sept. 17, 1948 |

FOREIGN PATENTS

| Number | Country | Date |
|---|---|---|
| 507,323 | Great Britain | June 9, 1939 |
| 514,687 | Great Britain | Nov. 15, 1939 |

Certificate of Correction

Patent No. 2,518,462                                                  August 15, 1950

DANIEL M. GOWING ET AL.

It is hereby certified that error appears in the printed specification of the above numbered patent requiring correction as follows:

Column 3, line 58, for ".4/1" read *4/1.*;

and that the said Letters Patent should be read as corrected above, so that the same may conform to the record of the case in the Patent Office.

Signed and sealed this 21st day of November, A. D. 1950.

[SEAL]

THOMAS F. MURPHY,
                                                     *Assistant Commissioner of Patents.*